United States Patent
Hutton et al.

(10) Patent No.: US 10,206,504 B2
(45) Date of Patent: Feb. 19, 2019

(54) LOCKING RECREATIONAL VEHICLE DRAWER

(71) Applicant: AMERICAN BOLT & SCREW MFG. INC., Fontana, CA (US)

(72) Inventors: Joshua Colby Hutton, Victorville, CA (US); Mark Edward Voss, Fontana, CA (US)

(73) Assignee: American Bolt & Screw Mfg. Inc., Fontana, CA (US)

( * ) Notice: Subject to any disclaimer, the term of this patent is extended or adjusted under 35 U.S.C. 154(b) by 0 days.

(21) Appl. No.: 15/480,861

(22) Filed: Apr. 6, 2017

(65) Prior Publication Data

US 2018/0289155 A1    Oct. 11, 2018

(51) Int. Cl.
  *A47B 88/00*    (2017.01)
  *A47B 88/493*   (2017.01)
  *A47B 88/423*   (2017.01)
  *A47B 88/477*   (2017.01)
  *B60P 3/36*     (2006.01)
  *B60R 11/00*    (2006.01)

(52) U.S. Cl.
  CPC .......... *A47B 88/493* (2017.01); *A47B 88/423* (2017.01); *A47B 88/477* (2017.01); *B60P 3/36* (2013.01); *B60R 11/00* (2013.01); *A47B 2210/0016* (2013.01); *A47B 2210/0032* (2013.01); *A47B 2210/0059* (2013.01); *B60R 2011/0052* (2013.01); *B60R 2011/0082* (2013.01)

(58) Field of Classification Search
  CPC .......... A47B 88/423; A47B 2088/4235; A47B 2210/0018; A47B 2210/0016

USPC .................. 312/333, 334.44, 334.46; 384/21
  See application file for complete search history.

(56) References Cited

U.S. PATENT DOCUMENTS

| 2,661,997 | A |   | 12/1953 | Wilmer |
| 6,145,945 | A | * | 11/2000 | Parvin .................. A47B 88/493 312/334.11 |
| 6,250,730 | B1 |  | 6/2001 | Roth et al. |
| 6,435,636 | B1 | * | 8/2002 | MacMillan .......... A47B 88/467 312/333 |
| 7,458,651 | B1 |  | 12/2008 | Radke et al. |
| 8,152,251 | B2 | * | 4/2012 | Huang ................... A47B 88/57 312/334.44 |
| 2006/0273605 | A1 |  | 12/2006 | Haspel et al. |

(Continued)

FOREIGN PATENT DOCUMENTS

| CH | 676915 A5 |   | 3/1991 |
| DE | 2639304 A1 |   | 4/1977 |
| DE | 3135222 | * | 3/1983 |

(Continued)

*Primary Examiner* — Janet M Wilkens
(74) *Attorney, Agent, or Firm* — Jeffrey G. Sheldon; Cislo & Thomas LLP

(57) ABSTRACT

A drawer latch comprising a base configured to couple to a first slide member, a drawer stop disposed on the base and positioned to contact a second slide member at a retracted position within the first slide member, and a least one arm extending from the base in a direction parallel to an axis of the first slide member and towards the second slide member, a distal portion of the arm having a protrusion configured to engage an indent disposed on a side of the second slide member when the second slide member is in the retracted position.

10 Claims, 4 Drawing Sheets

(56) References Cited

U.S. PATENT DOCUMENTS

2012/0169199 A1* 7/2012 Chen .................. A47B 88/57
                                                   312/334.44
2016/0157607 A1   6/2016 Uffner

FOREIGN PATENT DOCUMENTS

| EP | 3176351    | * | 6/2017  |
|----|------------|---|---------|
| GB | 24805 A    |   | 6/1913  |
| KR | 100629715 B1 |   | 9/2006  |
| WO | 2005112699 A2 |   | 12/2005 |

* cited by examiner

LOCKING RECREATIONAL VEHICLE DRAWER

BACKGROUND OF THE INVENTION

Many recreational vehicles have cabinets and drawers in their interior space, in order to store silverware, camping equipment, personal items, etc. The drawers are attached to the cabinets by a drawer slide, which typically comprises two outer rails that attach to the cabinet and the drawer, as well as at least one inner rail and sub components that work to improve performance and provide both structural and dynamic stability.

A common problem is that the drawers slide open when the recreational vehicle is driving on the street, going around a corner, or driving over rough terrain. Information related to known drawer latches can be found in the following: U.S. Pat. No. 2,661,997 to Wilmer, U.S. Pat. No. 6,250,730 to Roth et al., U.S. Pat. No. 7,458,651 to Radke et al., US20150157607 to Uffner, US20060273605 to Haspel et al., CH676915 to Rodenhaeuser, DE2639304A1 to Born, GB191224804 to Rudolf, KR100629715B1 to Sun, and WO05112699 to Masson. However, there are problems associated with known drawer latches.

Accordingly, there is a need for an improved drawer latch.

SUMMARY

The present invention is directed to a drawer latch that satisfies this need. In a first aspect of the present invention, there is provided a self-retaining drawer slide system comprising a first slide member configured to couple to a cabinet; a second slide member configured to couple to a drawer slideably disposed within the first slide member such that the first and second slide members telescopically engage one another, the second slide member slideable along an axis between an extended position and a retracted position, the second slide member including a distal portion having at least one indent disposed on one side of the second slide member; and a drawer latch coupled to a distal portion of the first slide member, the drawer latch comprising i) a base; ii) a drawer stop disposed on the base and positioned to contact the second slide member at its retracted position; and iii) at least one arm extending from the base in a direction parallel to the axis and towards the second slide member, a distal portion of the arm having a protrusion configured to engage the indent when the second slide member is at its retracted position to retain the second slide member in its retracted position. In another embodiment, the protrusion is compressible and sized to fit within the indent. In one embodiment, the protrusion is arch-shaped and hollow. In another embodiment of the invention, the arm is flexible and resiliently biased to facilitate engagement of the protrusion with the indent. In another embodiment of the invention, the second slide member comprises at least two indents disposed on opposed sides of the second slide member, and the drawer latch has at least two arms, each arm comprising a protrusion for engagement with one of the indents.

In a second aspect of the present invention, there is provided a self-retaining drawer slide system comprising a first slide member configured to couple to a cabinet; a second slide member slideably disposed within the first slide member; a third slide member configured to couple to the drawer slideably disposed within the second slide member such that the first, second, third slide members telescopically engage one another, the third slide member slideable along an axis between an extended position and a retracted position, the third slide member including a distal portion having at least one indent disposed on one side of the third slide member; and a drawer latch coupled to a distal portion of the first slide member, the drawer latch comprising i) a base; ii) a drawer stop disposed on the base and positioned to contact the third slide member at its retracted position; and iii) at least one arm extending from the base in a direction parallel to the axis and towards the second slide member, a distal portion of the arm having a protrusion configured to engage the indent when the third slide member is at its retracted position to retain the third slide member in its retracted position. In one embodiment, the protrusion is compressible. In another embodiment, the protrusion is arch-shaped and hollow. In another embodiment of the present invention, the arm is flexible and resiliently biased to facilitate engagement of the protrusion with the indent. In one embodiment of the present invention, the third slide member comprises at least two indents disposed on opposed sides of the third slide member, and the drawer latch has at least two arms, each arm comprising a protrusion for engagement with one of the indents.

In a third aspect of the prevention invention, there is provided a drawer latch comprising a base configured to couple to a first slide member; a drawer stop disposed on the base and positioned to contact a second slide member at a retracted position within the first slide member; and at least one arm extending from the base in a direction parallel to an axis of the first slide member and towards the second slide member, a distal portion of the arm having a protrusion configured to engage an indent disposed on a side of the second slide member when the second slide member is in the retracted position. In another embodiment of the present invention, the protrusion on the distal portion of the arm of the drawer latch is compressible. In another embodiment, the protrusion is arch-shaped and hollow. In one embodiment of the present invention, the arm is flexible and resiliently biased to facilitate engagement of the protrusion with the indent. In another embodiment of the present invention, the drawer latch comprises at least two arms, each arm comprising a protrusion for engagement with one of the indents.

DRAWINGS

These and other features, aspects, and advantages of the present invention will become better understood with reference to the following description, appended claims, and accompanying drawings where:

DESCRIPTION

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

Figure 1:
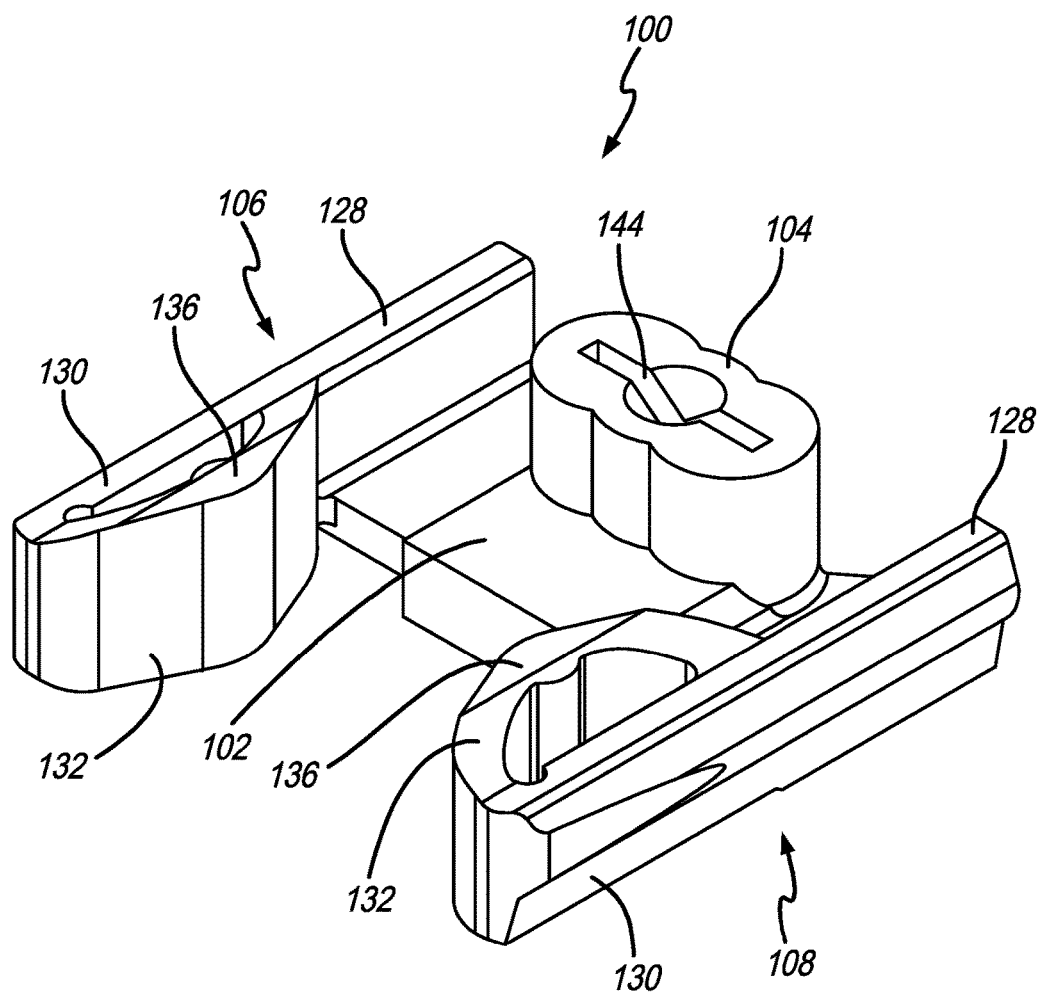
FIG. 1 is a perspective view of a drawer latch having features of the present invention.

Referring now to FIG. 1, there is shown a drawer latch 100 for placement on a drawer slide for retaining a drawer in the closed position, unless a user applies intentional force to open the drawer. The drawer latch 100 has a base 102 and a drawer stop 104 disposed on the base 102. In the embodiment shown in FIG. 1, there are two arms 106, 108 extending from the base, but in some embodiments only one arm 106 may be necessary.

The drawer latch 100 is suitable for applications such as drawers in recreational vehicles (RV's); however, the present invention also has other applications such as toolbox drawers, dressers, tables, etc. The drawer latch 100 prevents the drawer from unintentionally opening from turning, braking, or quick acceleration while an RV is in transit.

Figure 2:
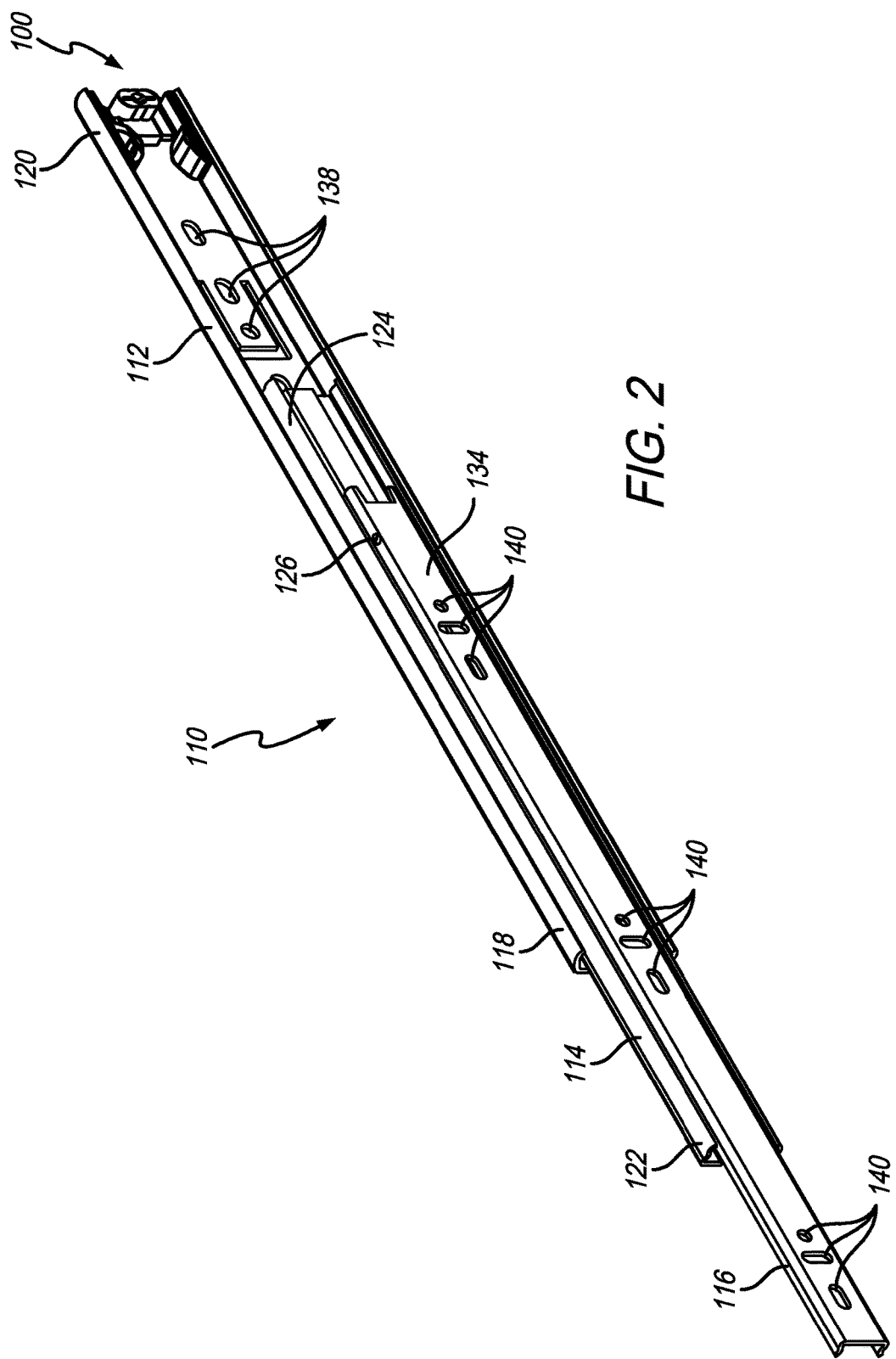
FIG. 2 is a perspective view of a plurality of slide members.

Referring now to FIG. 2, the drawer latch 100 may couple to and be used in conjunction with a plurality of slide members 110. The plurality of slide members 110 allow a drawer to extend out from and retract into a cabinet. The plurality of slide members 110 can be any number of slide members; however, typically the plurality of slide members comprise a first slide member 112, a second slide member 114, and a third slide member 116. It should be noted that the third slide member 116 is not necessary, and the plurality of slide members 110 can include only the first and the second slide member 112, 114. The plurality of slide members 110 are serially and telescopically engaged to one another.

The first slide member 112 may be attached to a cabinet and has a proximal portion 118 and a distal portion 120. The proximal portion 118 of the first slide member 112 is disposed towards the face of the cabinet, and the distal portion 120 of the first slide member 112 is disposed towards the rear of the cabinet. The drawer latch 100 is coupled to the distal portion 120 of the first slide member 112.

Figure 4:
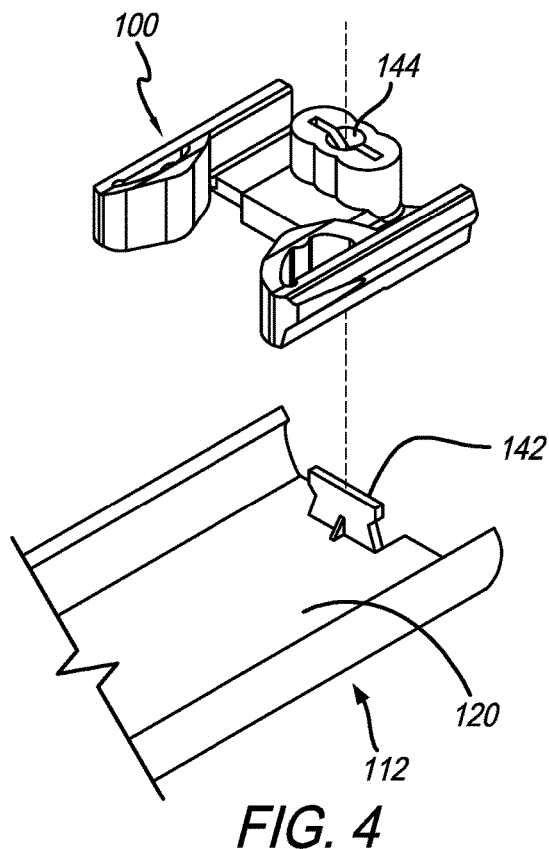
FIG. 4 is an exploded perspective view of the drawer latch coupling to the first slide member.

Typically, the drawer latch 100 is press fit into the first slide member 112. Preferably, at least one tab 142 extends from the distal portion 120 of the first slide member 112, and the drawer latch 100 comprises a slot 144 into which the tab 142 is inserted, as best shown in FIG. 4. This configuration prevents the drawer latch 100 from being moved out of place when engaging the second or third slide member 114, 116. Optionally, the drawer latch 100 can be coupled to the distal portion 120 of the first slide member 112 by a fastener, such as a screw, nail, bolt, etc.

In the event that the plurality of slide members 110 includes only the first and the second slide members 112, 114, the second slide member 114 is slideably disposed within the first slide member 112 and can be attached to the drawer. The second slide member 114 has a proximal portion 122 and a distal portion 124, wherein the proximal portion 122 is disposed proximate the drawer face and the distal portion 124 is disposed proximate the rear of the drawer. There is at least one indent 126 on one side of the distal portion 124 of the second slide member 114, but preferably there are two indents 126, one on either side of the distal portion 124 of the second slide member 114. The second slide member 114 is slideable along an axis between an extended position and a retracted position.

The arms 106, 108 of the drawer latch 100 extend from the base 102 in a direction parallel to the axis of the second slide member 114 and towards the second slide member 114. The arms 106, 108 each comprise a proximal portion 128 and a distal portion 130, and the distal portions 130 of the arms 106, 108 each have a protrusion 132 configured to engage one of the indents 126 when the second slide member 114 is at its retracted position to retain the second slide member 114 in its retracted position. The arms 106, 108 can be rigid and inflexible. Alternatively, the arms 106, 108 can be flexible and resiliently biased to facilitate engagement of the protrusions 132 with the indents 126.

The protrusions 132 are sized to fit within the indents 126, and can be either compressible or un-compressible. The protrusions 132 can also be hollow or solid. The protrusions 132 can be any shape, including but not limited to a triangle, rectangle, semi-circle or arch shaped. Preferably, the protrusions 132 are semi-circle or arch shaped, and hollow. Additionally, a rounded bump 136 can be disposed on each of the protrusions 132 for added gripping ability.

In the event the plurality of slide members 110 includes the third slide member 116, the second slide member 114 is still slideably disposed within the first slide member 112, but the third slide member 116 is coupled to the drawer and is slideably disposed within the second slide member 114. Additional slide members 110 can be used if a greater drawer extension is needed. If the third slide member 116 is utilized, then the second slide member 114 does not have any indents 126, and the one or more indents 126 are disposed on a distal portion 134 of the third slide member 116, as shown in FIG. 2. The third slide member 116 is also slideable along an axis between an extended position and a retracted position.

The arms 106, 108 of the drawer latch 100 extend from the base 102 in a direction parallel to the axis of the third slide member 116 and toward the third slide member 116. The protrusions 132 are configured to engage the indents 126 when the third slide member 116 is at its retracted position to retain the third slide member 116 in its retracted position.

As noted above, there may be embodiments where only one arm 106 is used. Accordingly, in that situation the second or the third slide member 114, 116 can have only one indent 126.

The drawer stop 104 disposed on the base 102 is positioned to contact either the second or the third slide member 114, 116 at its retracted position. The drawer stop 104 can be disposed at any location on the base 102 so long as it prevents either the second or third slide member 114, 116 from retracting too far, and maintains the engagement of the protrusions 132 with the indents 126. If the drawer stop 104 were not properly positioned, then the second or third slide member 114, 116 would be permitted additional movement that would cause the protrusions 132 to disengage from the indents 126.

When the plurality of slides 110 comprises the first and second slide members 112, 114 and the drawer is in the closed position, and the second slide member 114 is retracted into the first slide member 112 such that the arms 106, 108 of the drawer latch 100 extend along both sides of the distal portion of the second slide member 114 and the protrusions 132 engage the indents 126 on either side of the distal portion 122 of the second slide member 112, the distal portion 124 of the second slide member 114 contacts the drawer stop 104, preventing the drawer from retracting too deeply into the cabinet.

Figure 3:
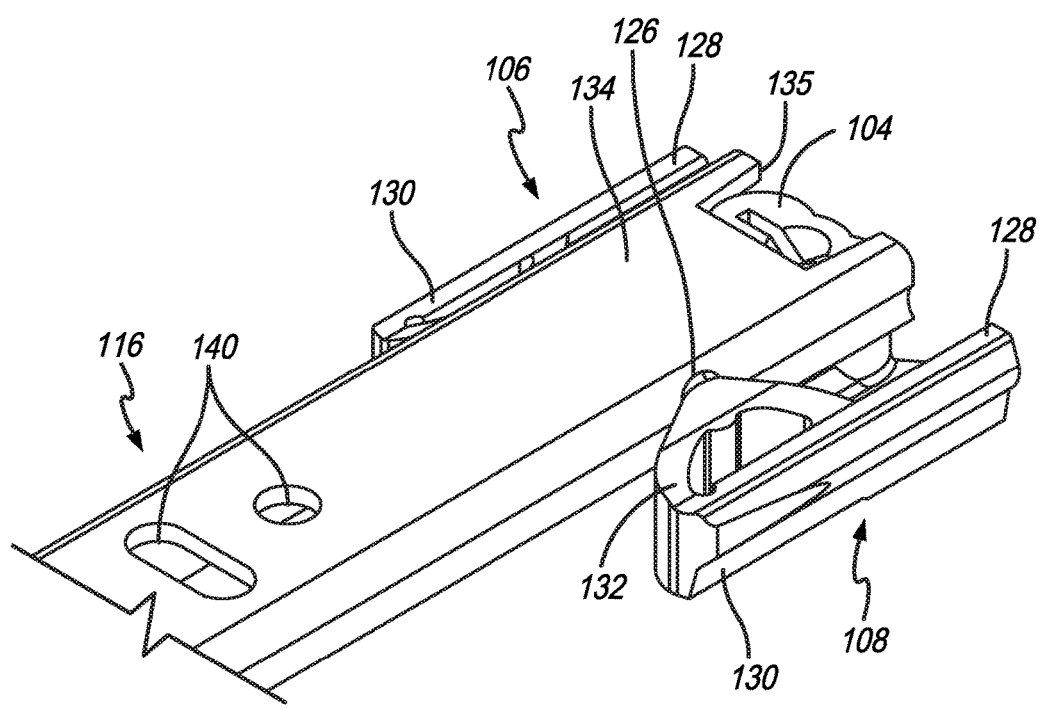
FIG. 3 is a perspective view of drawer latch engaging a slide member, for retaining the drawer in the closed position.

When the plurality of slides 110 comprises the first, second, and third slide members 112, 114, 116 and the drawer is in the closed position, and the second slide member 114 is retracted into the first slide member 112, and the third slide member 116 is retracted into the second slide member 114 such that the arms 106, 108 of the drawer latch 100 extend along both sides of the distal portion of the third slide member 116 and the protrusions 132 engage the indents 126 on either side of the distal portion 134 of the third slide member 116, the distal portion 134 of the third slide member 116 contacts the drawer stop 106, preventing the drawer from retracting too deeply into the cabinet. This is best shown in FIG. 3. The distal portion 134 of the third slide member 116 can comprise a notch 135 disposed therein. When the third slide member 116 is in the retracted position, the drawer stop 104 contacts and is disposed within the notch 135.

Optionally, the plurality of slide members 110 can comprise a first series of ball bearings and a second series of ball bearings in order to facilitate the slideable connection between the plurality of slide members 110. The first series of ball bearings is rotatably mounted between the first and the second slide member 112, 114. The second series of ball bearings is rotatably mounted between the second and third slide member 114, 116.

In order to mount the present invention onto the interior of a cabinet, the first slide member 112 comprises a plurality of cabinet mounting holes 138. The plurality of cabinet mounting holes 138 allows nails, screws, or similar fasteners to secure the present invention to the interior of the cabinet. The plurality of cabinet mounting holes 138 are distributed along the first slide member 112 in order to distribute the weight of the drawer and drawer contents to the cabinet. The plurality of cabinet mounting holes 138 traverses through the first slide member 112 in order to allow fasteners to secure the present invention onto the interior of the cabinet.

Similarly, the either the second slide member or the third slide member 114, 116 comprises a plurality of drawer mounting holes 140 in order to mount the present invention to the drawer. The plurality of drawer mounting holes 140 is distributed along either the second or the third slide member 114, 116 in order to distribute the weight of the drawer and drawer contents across the interior of the cabinet. The plurality of drawer mounting holes 140 traverses though either the second or the third slide member 114, 116 in order to allow fasteners to secure the present invention to the drawer.

The drawer latch 100 can be made from materials such as plastic, polyethylene plastic, or metal. In one exemplary embodiment, the drawer latch 100 is 35 mm tall and 35 mm wide. In a second exemplary embodiment, the drawer latch 100 is 35 mm tall and 46 mm wide. Typical slide members 110 have lengths from about 10 inches to about 28 inches, and widths from about 35 mm to about 37 mm to about 46 mm. But persons skilled in the art will appreciate that the size of the drawer latch 100 and the size of the slide members 110 are scalable depending on the size of the drawer and the cabinet.

Figure 5:
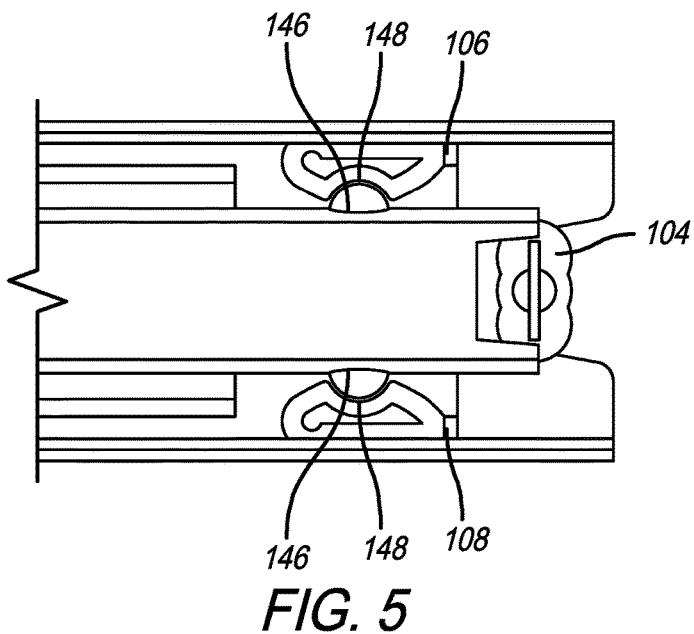
FIG. 5 is a top plan view of an alternative embodiment of the drawer latch of the present invention.

In an alternative embodiment, as shown in FIG. 5, rather than indents 126, the second or third slide member 114, 116 can comprise protrusions 146, and the arms 106, 108 of the drawer latch 100 each comprise an indent 148 for engaging the protrusions 146. Accordingly, the slide member 114, 116 is male and the arms 106, 108 of the drawer latch 100 are female. The convex protrusions 146 and indents 148 can be any shape so long as they perform the requisite male/female relationship necessary to facilitate engagement between the slide member 114, 116 and the drawer latch 100.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended features should not be limited to the description of preferred embodiments contained in this disclosure. All references cited herein are incorporated by reference in their entirety.

What is claimed is:

1. A self-retaining drawer slide system comprising:
   a) a first slide member configured to couple to a cabinet;
   b) a second slide member configured to couple to a drawer slideably disposed within the first slide member such that the first and second slide members telescopically engage one another, the second slide member slideable along an axis between an extended position and a retracted position, the second slide member including a distal portion having at least one indent disposed on one side of the second slide member; and
   c) a drawer latch coupled to a distal portion of the first slide member, the drawer latch comprising:
      i) a base;
      ii) a drawer stop disposed on the base and positioned to contact the second slide member at its retracted position; and
      iii) a least one arm extending from the base in a direction parallel to the axis and towards the second slide member, a distal portion of the arm having a protrusion configured to engage the indent when the second slide member is at its retracted position to retain the second slide member in its retracted position.

2. The system of claim 1, wherein the protrusion is compressible and sized to fit within the indent.

3. The system of claim 2, wherein the protrusion is arch-shaped and hollow.

4. The system of claim 1, wherein the arm is flexible and resiliently biased to facilitate engagement of the protrusion with the indent.

5. The system of claim 1, wherein the second slide member comprises two indents disposed on opposed sides of the second slide member, and the drawer latch has two arms for engagement with the two indents.

6. A self-retaining drawer slide system comprising:
   a) a first slide member configured to couple to a cabinet;
   b) a second slide member slideably disposed within the first slide member;
   c) a third slide member configured to couple to a drawer slideably disposed within the second slide member such that the first, second, third slide members telescopically engage one another, the third slide member slideable along an axis between an extended position and a retracted position, the third slide member including a distal portion having at least one indent disposed on one side of the third slide member; and
   d) a drawer latch coupled to a distal portion of the first slide member, the drawer latch comprising:
      i) a base;
      ii) a drawer stop disposed on the base and positioned to contact the third slide member at its retracted position; and
      iii) a least one arm extending from the base in a direction parallel to the axis and towards the second slide member, a distal portion of the arm having a protrusion configured to engage the indent when the third slide member is at its retracted position to retain the third slide member in its retracted position.

7. The system of claim 6, wherein the protrusion is compressible.

8. The system of claim 7, wherein the protrusion is arch-shaped and hollow.

9. The system of claim 8, wherein the arm is flexible and resiliently biased to facilitate engagement of the protrusion with the indent.

10. The system of claim 6, wherein the third slide member comprises two indents disposed on opposed sides of the third slide member, and the drawer latch has two arms for engagement with the two indents.

* * * * *